US008714768B2

(12) United States Patent
Tittle

(10) Patent No.: US 8,714,768 B2
(45) Date of Patent: May 6, 2014

(54) SOLAR RETROFIT LIGHTING SYSTEM

(76) Inventor: Larry Tittle, Metairie, LA (US)

( * ) Notice: Subject to any disclaimer, the term of this patent is extended or adjusted under 35 U.S.C. 154(b) by 230 days.

(21) Appl. No.: 13/485,293

(22) Filed: May 31, 2012

(65) Prior Publication Data
US 2013/0322063 A1 Dec. 5, 2013

(51) Int. Cl.
H01L 31/042 (2014.01)

(52) U.S. Cl.
CPC .......... H01L 31/0422 (2013.01); H01L 31/042 (2013.01)
USPC ............................ 362/183; 362/431; 362/145

(58) Field of Classification Search
CPC .......................... H01L 31/042; H01L 31/0422
USPC ...................... 362/431, 145, 183, 249.02, 276
See application file for complete search history.

(56) References Cited

U.S. PATENT DOCUMENTS

| | | | | |
|---|---|---|---|---|
| 4,224,082 A * | 9/1980 | Jacobson | ...................... | 136/248 |
| 4,281,369 A * | 7/1981 | Batte | ............................ | 362/183 |
| 4,486,820 A | 12/1984 | Baba et al. | | |
| 4,841,416 A | 6/1989 | Doss | | |
| 5,149,188 A * | 9/1992 | Robbins | ........................ | 362/183 |
| 6,060,658 A * | 5/2000 | Yoshida et al. | ............... | 136/243 |
| 6,422,714 B1 | 7/2002 | Hubbell | | |
| 6,942,361 B1 | 9/2005 | Kishimura et al. | | |
| D598,598 S * | 8/2009 | Zhou et al. | ..................... | D26/68 |
| 7,731,383 B2 * | 6/2010 | Myer | ............................ | 362/145 |
| 7,931,385 B1 * | 4/2011 | Smith | ............................ | 362/145 |
| 7,976,180 B1 * | 7/2011 | Haun et al. | ..................... | 362/183 |
| 7,988,320 B2 * | 8/2011 | Brumels | ....................... | 362/192 |
| 7,997,754 B2 | 8/2011 | Zhang et al. | | |
| 8,007,124 B2 * | 8/2011 | Kim | ............................... | 362/158 |
| 8,029,151 B2 | 10/2011 | Butler | | |
| 8,029,154 B2 | 10/2011 | Myer | | |
| 8,040,102 B2 | 10/2011 | Kao et al. | | |
| 8,157,406 B2 * | 4/2012 | Zheng | ............................ | 362/183 |
| 8,186,845 B2 * | 5/2012 | Zheng | ............................ | 362/183 |
| 8,350,482 B2 * | 1/2013 | Nevins | ........................... | 315/149 |
| 2004/0261334 A1 * | 12/2004 | Liebendorfer et al. | ....... | 52/173.1 |
| 2010/0206379 A1 * | 8/2010 | Littau et al. | .................... | 136/259 |
| 2011/0017256 A1 * | 1/2011 | Stevens | .......................... | 136/244 |
| 2011/0061711 A1 * | 3/2011 | Luo et al. | ........................ | 136/244 |
| 2011/0305010 A1 * | 12/2011 | Leadford et al. | ............... | 362/183 |
| 2012/0113625 A1 * | 5/2012 | Werner et al. | ................... | 362/183 |
| 2012/0227788 A1 * | 9/2012 | Lundahl et al. | ................ | 136/246 |
| 2012/0228442 A1 * | 9/2012 | Clifton | ........................ | 248/163.1 |

(Continued)

FOREIGN PATENT DOCUMENTS

| | | |
|---|---|---|
| CN | 201753884 U | 2/2011 |
| GB | 2408395 A1 | 5/2005 |
| WO | 2010050993 A1 | 6/2010 |

Primary Examiner — Diane Lee
Assistant Examiner — Gerald J Sufleta, II
(74) Attorney, Agent, or Firm — Juan J. Lizarraga

(57) ABSTRACT

A solar retrofit lighting system for light poles with a solar array panel assembly having semi-circular backing panels attached to adjustable internal mounting brackets or pole frames suitable to any size light pole and mounted in parallel with the longitudinal axis of the light pole with thin film photovoltaic laminate adhesively attached to the outer convex sides of the backing panels. A battery for storage of electrical energy from the thin film photovoltaic laminate will be provided along with a charge controller to regulate the charging of the battery, an inverter to convert DC to AC power and an LED light fixture extending from the pole. Alternatively, an on-grid option will be utilized at the pole, to convert and send energy back to the grid and draw power from the grid as needed when sunlight is unavailable.

5 Claims, 5 Drawing Sheets

(56) References Cited

U.S. PATENT DOCUMENTS

| | | | |
|---|---|---|---|
| 2013/0000632 A1* | 1/2013 | Lundahl et al. | 126/574 |
| 2013/0075545 A1* | 3/2013 | Fischer | 248/122.1 |
| 2013/0160816 A1* | 6/2013 | Barton | 136/246 |
| 2013/0227833 A1* | 9/2013 | Rizzo | 29/525.03 |
| 2013/0240024 A1* | 9/2013 | Kim | 136/251 |
| 2013/0258646 A1* | 10/2013 | Wang | 362/184 |
| 2013/0265786 A1* | 10/2013 | Quinzi et al. | 362/431 |
| 2013/0298961 A1* | 11/2013 | McGlynn et al. | 136/244 |

\* cited by examiner

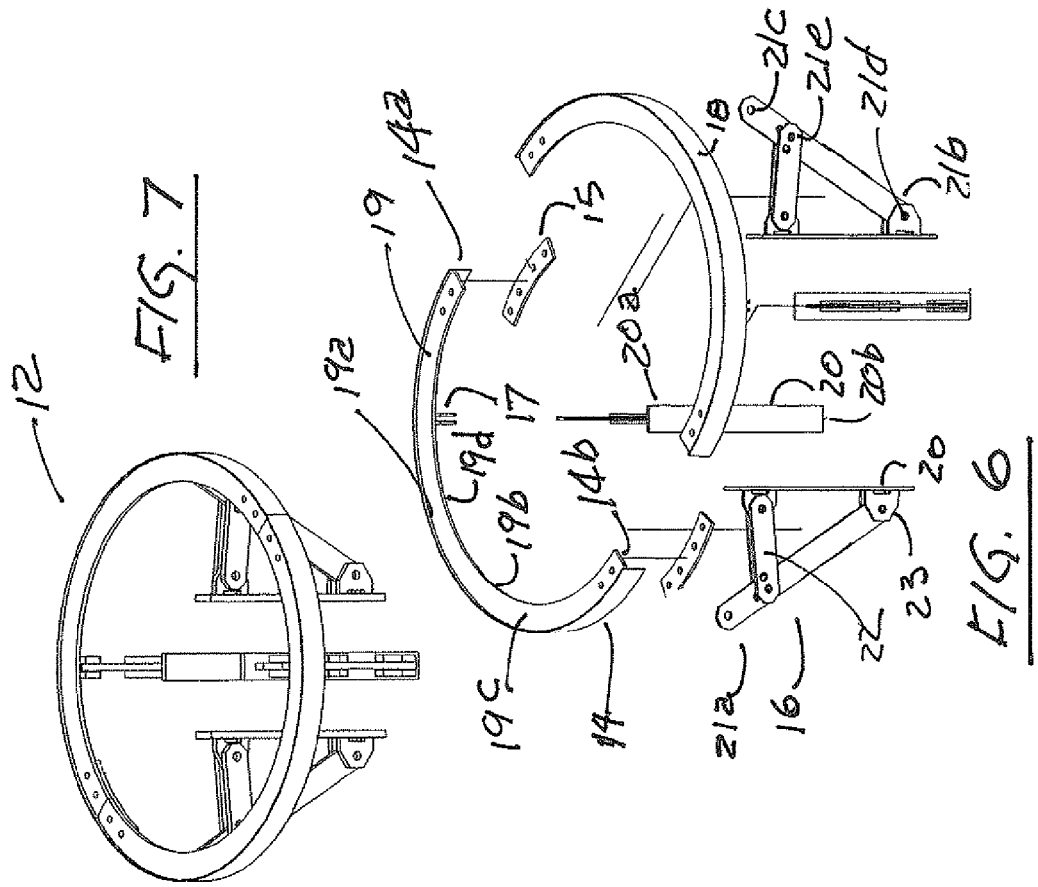
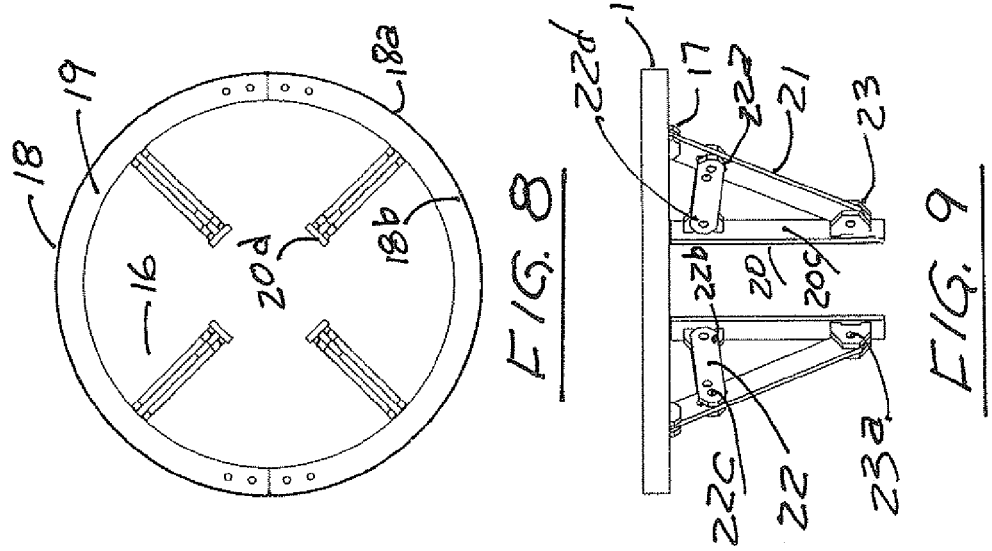

SOLAR RETROFIT LIGHTING SYSTEM

BACKGROUND OF THE INVENTION

This invention relates to the retrofitting of both functioning and non-functioning outdoor light poles with solar power to replace or supplement the conventional power supply from the "grid." More particularly, the invention relates to the use of solar laminate film affixed to at least (2) two semi-circular aluminum lightweight panels, which will attach to adjustable internal mounting brackets. These panels will be affixed to any dimension, diameter, or finish. This will be applicable with any existing pole without compromising the integrity of the existing pole.

The use of solar power for street lights has been attempted in the past and most attempts involve the use of flat rectangular solar panels mounted atop the light pole. This type of application is prone to failure, particularly in areas subjected to high winds such as experienced in hurricanes. A more recent attempt as shown in Myer, U.S. Pat. No. 7,731,383 shows a self-contained solar powered light pole fabricated with flexible solar laminate film attached to the outer surface of the pole wall itself. In the Myer '383 invention, the pole itself is a new installation with cooling vents and is installed as a new light pole with attendant cost. In Myer, U.S. Pat. No. 8,029,154, a continuation of the Myer '383 patent, flexible solar laminate film is adhesively connected to the outside surface of a light pole.

Unfortunately, installation of an entirely new pole, whether solar powered or not, is not always possible because of the financial shortfalls facing most municipalities and administrations that provide public lighting. In addition, most cities have a significant number of non-functioning or abandoned street lights and light poles. For example, administration officials in the City of New Orleans said in May of 2012, that of the 55,000 street lights in the city, more than 10,900 were not working. Tragic accidents have occurred where highways and streets are unlit and lined with inoperable light poles. In addition to general traffic safety concerns, a loss of conventional city power from the "grid" during a storm or natural disaster renders all street lighting useless at a time when it is needed the most.

Likewise, the concept of adhesively attaching flexible solar laminate film to an existing pole is impractical and limited in that there are many versions of light pole with different cross sections, some being cylindrical, and some being octagonal. Other light poles are roughly cylindrical but have a rough hewn outer surface as in the ubiquitous timber pole. Obviously, many of existing light poles do not have an outer surface suitable for adhesive attachment of flexible solar laminate film directly to the outer surface.

There is a definite need for a reliable system to retrofit all types of existing light poles with a solar power system that would operate during power outages, supplement the grid", and also provide lighting and power to abandoned light poles. Likewise, there is a need for a solar powered lighting system for light poles that can sustain a storm event without damage.

SUMMARY OF THE INVENTION

It is an object of the invention to provide a solar retrofit lighting system for light poles having a vertical longitudinal axis comprising at least two semi-circular rigid longitudinal panels mounted along the exterior surface of an existing light pole where the panels would have a concave inner surface and a convex outer surface with the inner surface facing the exterior surface of the light pole but with a space between the concave inner surface and the exterior surface of the light pole, and a thin film photovoltaic laminate adhesively attached to the convex outer surface. The semi-circular rigid longitudinal panels would be mounted in parallel with the longitudinal axis of the light pole with spacer bolts, nuts and washers, and the spacer bolts holding the panels away from the light pole at a distance sufficient to create a space allowing for air circulation.

It is a further object of this invention to provide a solar array panel assembly for installation on existing light poles both powered and not powered, with solar array pole frames, solar array backing panels having a curved cross section describing a portion of a circle with an outer convex side and an inner concave side having thin film photovoltaic laminate adhesively attached, where the solar array pole frames support the solar array backing panels on the inner concave side of the backing panels, and where the solar array pole frames are adjustable to various sizes and configurations of light poles, and further to provide end caps at both ends of the solar array panel assembly. The present invention would further comprise a battery (located at the top of the existing pole) for storage of electrical energy from the thin film photovoltaic laminate, a charge controller to regulate the charging of the battery, an inverter to convert DC to AC power and an LED light fixture extending from the pole. Alternatively, an on-grid option will be utilized where as a grid tied inverter will be place at the pole location, converted and sent through utility lines back to the grid. Inversely, we will draw power from the grid which will be commercially metered as needed for hours when sunlight is unavailable.

It is a further object of this invention to provide a method for providing a solar retrofit lighting system for light poles with a vertical longitudinal axis, an external surface, an upper end and a lower end, the method including: a) providing a solar array panel assembly having an upper end and a lower end with an upper end cap and a lower end cap, with more than one semi-circular backing panels having an upper and lower end, having an outer convex surface and an inner concave surface with thin film photovoltaic laminate adhesively attached to the outer convex surface, said panel assembly to be mounted in parallel with the longitudinal axis of the light pole, and said panel assembly to be supported on the inner concave surface by a plurality of pole frames to be mounted to the external surface of the light pole, a battery for storage of electrical energy from the thin film photovoltaic laminate, a controller to regulate charging of the battery, an inverter to convert DC power to AC power; and an LED light fixture; b) mounting the plurality of pole frames to the external surface of the light pole; c) mounting the backing panels on the plurality of pole frames in parallel with the longitudinal axis of the light pole; d) installing end caps at the upper and lower ends of the backing panels and cutting the opening to fit the light pole; e) installing the battery, controller and inverter to receive electrical energy from the thin film photovoltaic laminate; f) installing an LED light fixture at or near the upper end of the light pole; and g) providing a grid-tied inverter to convert and send power into a power grid and draw power from the power grid as needed and installing the grid-tied inverter.

BRIEF DESCRIPTION OF THE DRAWINGS

FIG. 4 is a longitudinal cross section of the solar array panel assembly showing a plurality of solar array panel assembly pole frames.

FIG. 5 is a side elevation of a solar array panel assembly pole frame within the solar array panel assembly.

FIG. 6 is an exploded view of a solar array panel assembly pole frame.

FIG. 7 is a perspective view of a solar array panel assembly pole frame.

FIG. 8 is an overhead view of a solar array panel assembly pole frame.

FIG. 9 is a side elevation of a solar array panel assembly pole frame.

DETAILED DESCRIPTION OF THE INVENTION

Figure 1:
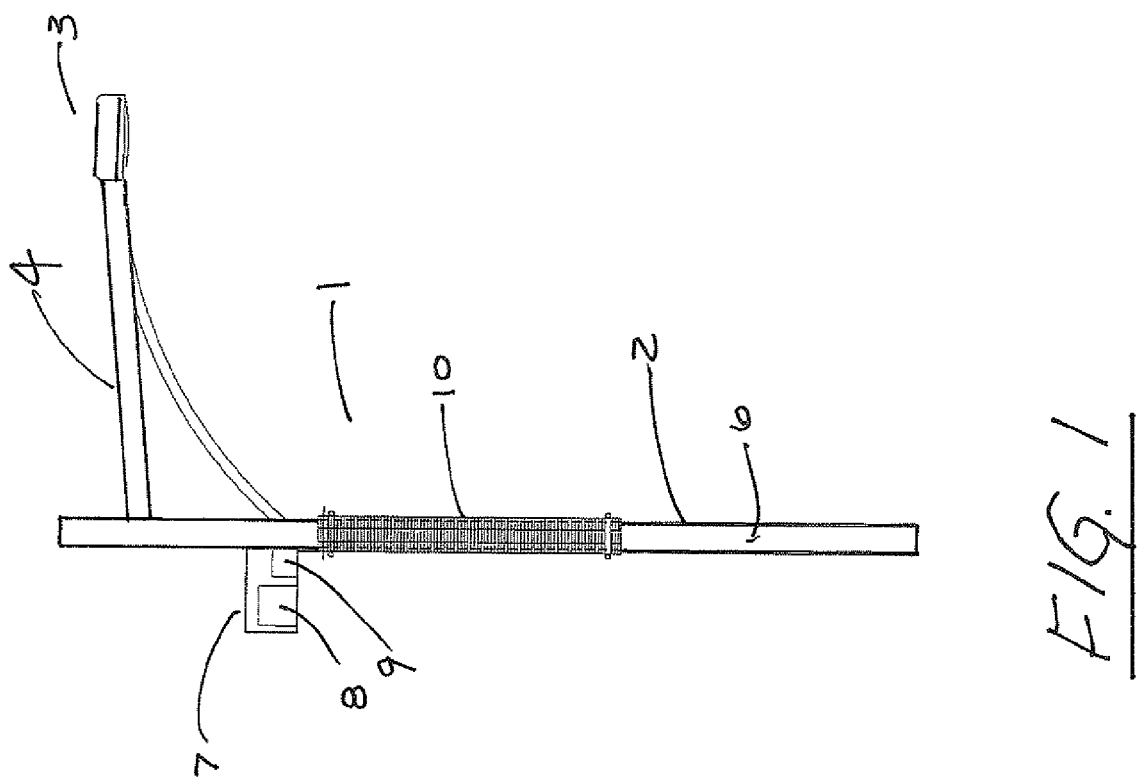
FIG. 1 is an elevation of the solar retrofit lighting system installed on a light pole.

The elevation depicted in FIG. 1 shows the inventive solar retrofit lighting system 1 installed on a light pole 2 with an LED light fixture 3 on a support 4. Mounted out from the outer surface 6 of the light pole 2 is a solar array panel assembly 10 for collection of solar energy and generation of electricity. The electricity generated from the solar array panel assembly will be conducted to a module 7 and through an inverter to convert DC to AC power with a storage battery 8 and a controller 9 to regulate the charging of the battery that will in turn provide power to the LED light fixture 3 extending from the light pole 2 during darkness or supplement electrical power to those poles on the "grid". Alternatively, an on-grid option will be utilized where as a grid tied inverter will be place at the pole location, converted and sent through utility lines back to the grid. Inversely, we will draw power from the grid which will be commercially metered as needed for hours when sunlight is unavailable.

Figure 2:
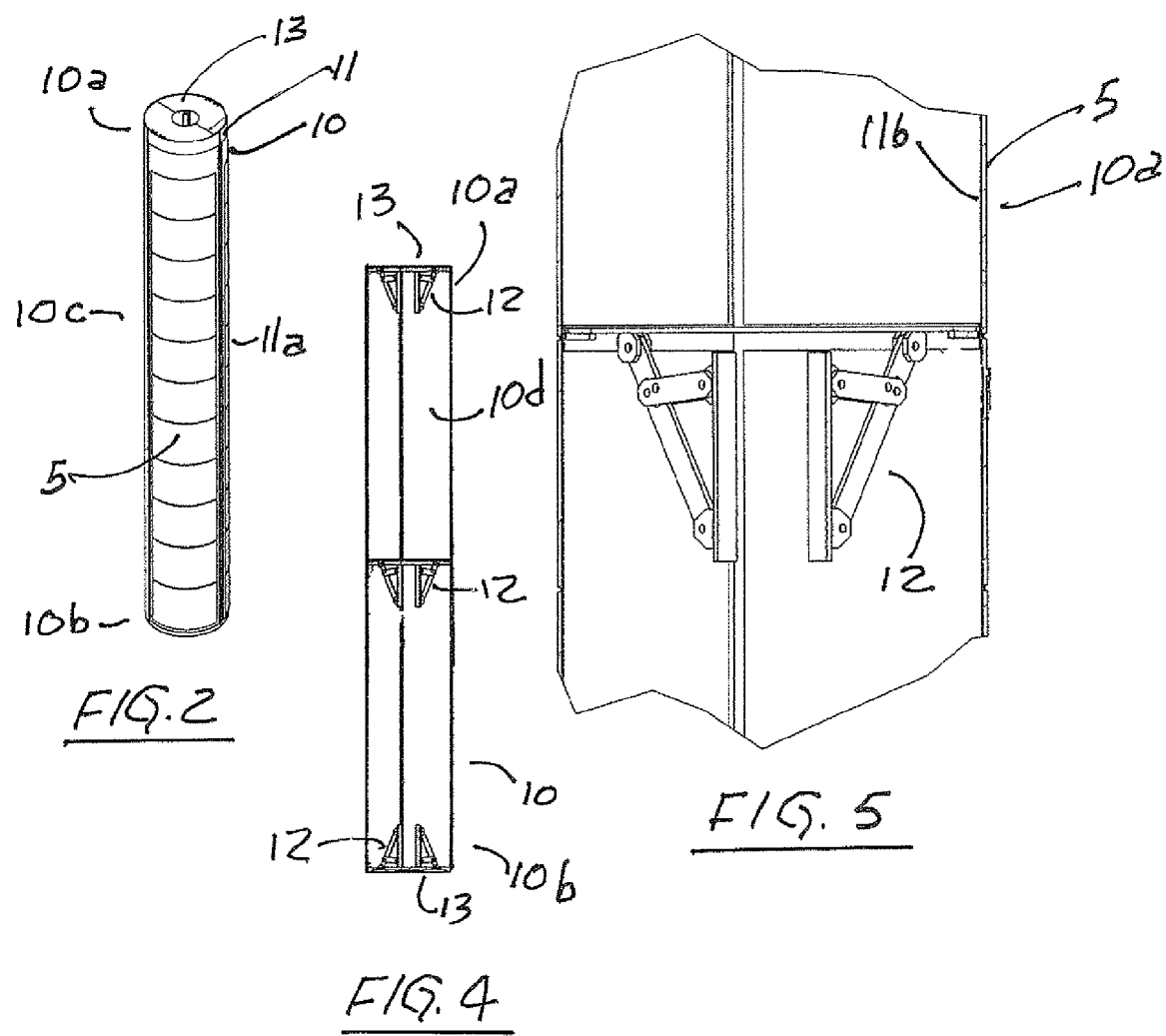
FIG. 2 is a perspective view of the solar array panel assembly.

FIG. 2 shows a perspective view of a solar array panel assembly 10 with an upper end 10a and a lower end 10b and a cover assembly 13 at both upper and lower ends 10a and 10b although only the cover assembly 13 at the upper end 10a can be seen in FIG. 2. On the exterior side 10c of the solar array panel assembly 10 are backing panels 11 having a curved cross section describing a portion of a circle with an outer convex side 11a and an inner concave side 11b not seen in FIG. 2. On the outer convex side 11a of the backing panels 11 is adhesively attached thin film photovoltaic laminate 5. A lightweight yet rigid material such as aluminum would be suitable for the backing panels 11.

Figure 3:
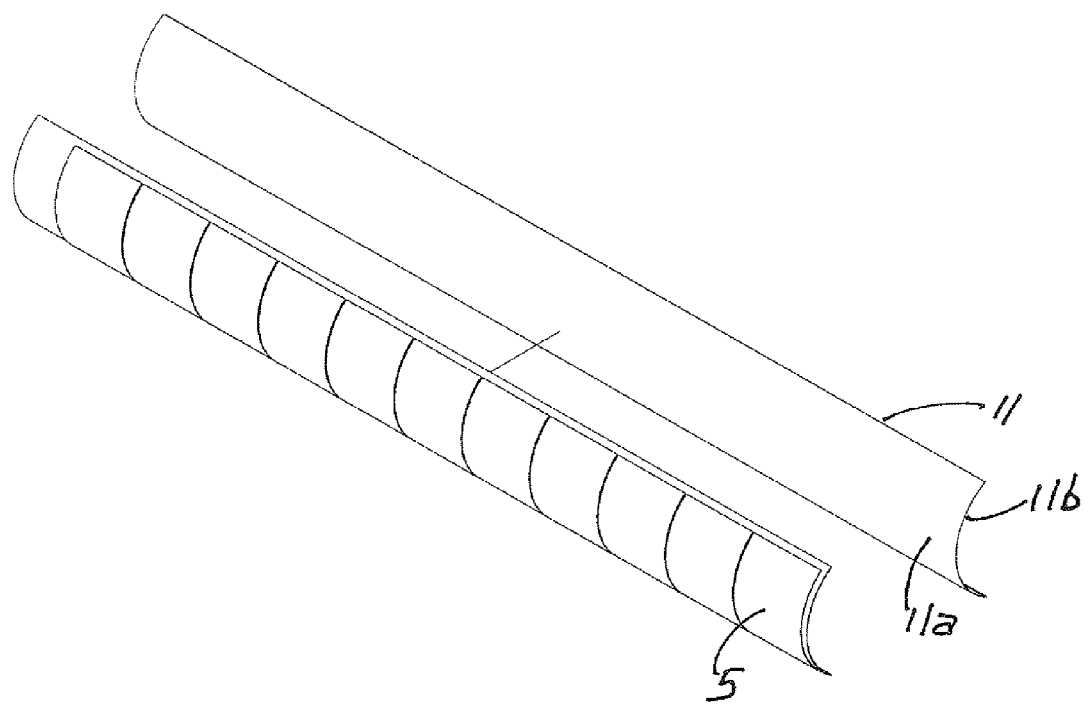
FIG. 3 is an exploded perspective view of the thin film photovoltaic laminate superimposed over a solar array backing panel.

FIG. 3 show an exploded perspective view of the thin film photovoltaic laminate 5 superimposed over the outer convex side 11a of a solar array backing panel 11. It is understood that there may be more than one solar array backing panel 11 on the solar array panel assembly 10, and thin film photovoltaic laminate 5 is adhesively attached to the outer convex side 11a of at least one solar array backing panel 11.

FIG. 4 depicts a longitudinal cross section of the solar array panel assembly 10 with the upper end 10a, the lower end 10b, and the interior side 10d that would correspond to the inner concave sides 11b of the solar array backing panels 11. Within the interior of the solar array panel assembly 10 and between the interior sides 10d are shown a plurality of solar array panel assembly adjustable internal mounting brackets hereinafter referred to as pole frames 12, also shown in greater detail in FIG. 5. At both the upper end 10a and the lower end 10b of the solar array panel assembly 10 are shown cover assemblies 13.

In FIGS. 6, 7, 8 and 9 are shown respectively an exploded view, a perspective view, an overhead view and a side elevation of a solar array panel assembly pole frame 12. As shown the pole frame 12 has pole frame bands 14 with pole band plates 18, pole band ring plates 19, pole frame connection plates 15, ring lugs 17, and pole frame connection linkages 16. Each of the pole frame connection linkages 16 has a linkage 20, a diagonal linkage 21, a brace 22, and linkage lugs 23. As shown, the linkage members will have suitable pin connections. A light weight rigid material such as aluminum would be suitable for manufacture of the pole frames 12.

As shown the pole frame bands 14 describe a semi-circular arc of a radius matching the curvature of the inner concave side 11b of the solar array backing panels 11. The pole frame bands 14 have a pole band plate 18 with an outer surface 18a and an inner surface 18b, and a pole band ring plate 19 with an outer edge 19a and an inner edge 19b, as well as an upper surface 19c and a lower surface 19d. The inner surface 18b of the pole band plate 18 is fixedly attached to the outer edge 19a of the pole band ring plate 19. The outer surface 18a of the pole band plate 18 will directly contact the inner concave side 11b of the solar array backing panels 11 when the solar array panel assembly 10 is complete and installed on a light pole 2. Each semi-circular pole frame band 14 has a right end 14a and left end 14b. The right end 14a of one pole frame band 14 will be attached to the left end of another pole frame band 14 and the left end of the first pole frame band 14 will be attached to the right end of the second pole frame band 14 to form a complete circle. This attachment will be accomplished with connection plates 15 bolted or otherwise attached to the upper or lower surfaces 19c and 19d of the pole band ring plates 19 at the of the right end 14a and left end 14b of connecting pole frame bands 14. It is understood that the connection of pole frame bands 14 will be accomplished around a light pole 2 in conjunction with the installation of the solar array panel assembly 10.

On the upper or lower surfaces 19c and 19d of the pole band ring plates 19 will be rigidly attached at least one ring lug 17 with a circular aperture 17a for insertion of a pivot pin. Pivotally connected to each ring lug 17 at the circular aperture 17a will be a connection linkage 16 with a diagonal linkage 21, a pole band brace 22, linkage lugs 23 and a pole band linkage 20. The diagonal linkage 21 has an upper end 21a and a lower end 21b. The upper end 21a will have a circular aperture 21c for insertion of a pivot pin and will be pivotally connected to the circular aperture 17a of a ring lug 17. The lower end 21b likewise will have a circular aperture 21d for insertion of a pivot pin. In addition the diagonal linkage 21 will have an intermediate circular aperture 21e disposed between the upper end 21a and a lower end 21b for insertion of a pivot pin. The pole band brace 22 has an outer end 22a and an inner end 22b with circular apertures 22c and 22d respectively, each for insertion of a pivot pin. The pole band linkage 20 has an upper end 20a and a lower end 20b, an inner side 20c and an outer side 20d. On the inner side 20c at both the upper end 20a and a lower end 20b is affixed a linkage lug 23 with a circular aperture 23a for insertion of a pivot pin. The outer end 22a of the pole band brace 22 is pivotally connected to the intermediate circular aperture 21e of the diagonal linkage 21, and the inner end 22b of the pole band brace is pivotally connected to the linkage lug 23 on the upper end 20a and inner side 20c of the pole band linkage 20. The lower end 21b of the diagonal linkage 21 is pivotally connected to the linkage lug 23 at the lower end 20b and the inner side 20c of the pole band linkage 20.

The outer side 20d of the pole band linkage will directly contact the outer surface 6 of the light pole 2. More than one intermediate circular aperture 21e in the diagonal linkage 21 and more than one circular aperture 22c at the outer end 22a of the pole band brace 22 will be provided to allow for adjustment to suit variations in light pole configuration and diameter.

Figure 10:
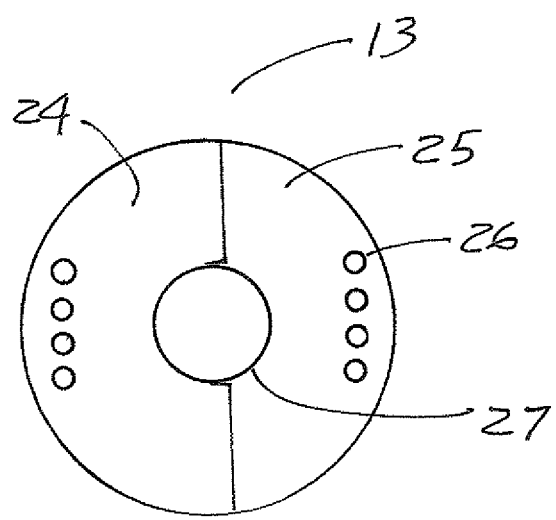
FIG. 10 is an overhead view of a cover assembly.

FIG. 10 shows an end cap cover assembly 13 with a flanged end cap side 24 and a non flanged end cap side 25. The assembly 13 will be installed at both the upper end 10a and a lower end 10b of the solar array panel assembly 10. The end cap sides 24 and 25 will both have apertures 26 for cables and other service, in addition to an end cap opening 27 for the light pole 2. It is understood that end cap opening 27 will be cut to fit the light pole 2.

In practice, a plurality of solar array pole frames 12 will be installed on a light pole 2 made the subject of the inventive solar retrofit lighting system. As shown in FIG. 4, there will be one solar array pole frame 12 at both the upper end 10a and a lower end 10b of the solar array panel assembly 10. Once the solar array pole frames 12 have been installed, solar array backing panels 11 with thin film photovoltaic laminate 5 adhesively attached to the outer convex side 11a of at least one solar array backing panel 11 will be mounted upon the installed solar array pole frames 12. It is not intended that the thin film photovoltaic laminate 5 must be installed completely around the solar array panel assembly 10, but will be placed in accordance with the power requirements and best solar placement.

I claim:

1. A solar retrofit lighting system for light poles with a vertical longitudinal axis and an external surface comprising:
    a solar array panel assembly having an upper end and a lower end with an upper end cap and a lower end cap, with semi-circular backing panels having an outer convex surface and an inner concave surface with thin film photovoltaic laminate adhesively attached to the outer convex surface, said assembly mounted in parallel with the longitudinal axis of the light pole, and said panel assembly supported on the inner concave surface by a plurality of pole frames mounted to the external surface of the light pole;
    a battery for storage of electrical energy from the thin film photovoltaic laminate;
    a controller to regulate charging of the battery;
    an inverter to convert DC power to AC power;
    an LED light fixture;
    where the pole frames are adjustable to the external surface of the light pole and comprise pole frame bands matched and attached to the inner concave surface of the backing panels, said pole frame bands supported by a pole frame connection linkage in turn engaged against the external surface of the light pole; and
    where the pole frame connection linkages have more than one circular aperture for insertion of pivot pins allowing for variation in light pole dimensions.

2. The solar retrofit lighting system of claim 1 further comprising a grid-tied inverter to convert and send power into a power grid and draw power from the power grid as needed.

3. The solar retrofit lighting system of claim 1 where the upper end cap and a lower end cap will each have an opening cut to fit the light pole.

4. A method for providing a solar retrofit lighting system for light poles with a vertical longitudinal axis, an external surface, an upper end and a lower end, the method comprising:
    providing a solar array panel assembly having an upper end and a lower end with an upper end cap and a lower end cap, each with an opening for the light pole to match a circumference of the light pole, with more than one semi-circular backing panels having an upper and lower end, having an outer convex surface and an inner concave surface with thin film photovoltaic laminate adhesively attached to the outer convex surface, said panel assembly to be mounted in parallel with the longitudinal axis of the light pole, and said panel assembly to be supported on the inner concave surface by a plurality of pole frames to be mounted to the external surface of the light pole, the pole frames being provided with pole frame bands and a pole frame connection linkage having more than one circular aperture, the circular aperture having a size which is adjustable via insertion of pivot pins therein, a battery for storage of electrical energy from the thin film photovoltaic laminate, a controller to regulate charging of the battery, an inverter to convert DC power to AC power; and an LED light fixture;
    mounting the plurality of pole frames to the external surface of the light pole, matching and attaching the pole frame bands to the inner concave surface of the backing panels, supporting said pole frame bands with the pole frame connection linkage, engaging the pole frame connection linkage against the external surface of the light pole, and adjusting the pole frame connection linkages to match the circumference of the light pole by insertion of pivot pins into the more than one circular aperture;
    mounting the backing panels on the plurality of pole frames in parallel with the longitudinal axis of the light pole;
    installing end caps at the upper and lower ends of the backing panels and cutting the opening to fit the light pole;
    installing the battery, controller and inverter to receive electrical energy from the thin film photovoltaic laminate;
    installing an LED light fixture at or near the upper end of the light pole.

5. The method of claim 4 further comprising the step of providing a grid-tied inverter to convert and send power into a power grid and draw power from the power grid as needed and installing the grid-tied inverter.

* * * * *